(12) United States Patent
Bröker

(10) Patent No.: US 7,739,291 B2
(45) Date of Patent: Jun. 15, 2010

(54) METHODS AND SYSTEMS FOR DISPLAYING MATCHING BUSINESS OBJECTS

(75) Inventor: Norbert Bröker, Rauenberg (DE)

(73) Assignee: SAP AG, Walldorf (DE)

( * ) Notice: Subject to any disclaimer, the term of this patent is extended or adjusted under 35 U.S.C. 154(b) by 567 days.

(21) Appl. No.: 11/050,705

(22) Filed: Feb. 7, 2005

(65) Prior Publication Data
US 2006/0179036 A1    Aug. 10, 2006

(51) Int. Cl.
G06F 7/00 (2006.01)
G06F 17/30 (2006.01)

(52) U.S. Cl. .................. 707/758; 707/759; 705/10; 705/26

(58) Field of Classification Search ............... 707/3, 707/4, 5, 6
See application file for complete search history.

(56) References Cited

U.S. PATENT DOCUMENTS

| | | | | |
|---|---|---|---|---|
| 6,789,252 | B1* | 9/2004 | Burke et al. | 717/100 |
| 6,831,655 | B2* | 12/2004 | Hrebejk et al. | 345/581 |
| 7,133,867 | B2* | 11/2006 | Irle et al. | 707/4 |
| 2002/0052769 | A1* | 5/2002 | Navani et al. | 705/7 |
| 2003/0158760 | A1* | 8/2003 | Kannenberg | 705/4 |
| 2004/0162816 | A1* | 8/2004 | Irle et al. | 707/3 |
| 2004/0177319 | A1* | 9/2004 | Horn | 715/501.1 |
| 2004/0190032 | A1* | 9/2004 | Ferlitsch | 358/1.13 |
| 2005/0015305 | A1* | 1/2005 | Agarwal | 705/26 |
| 2005/0021523 | A1* | 1/2005 | Farag | 707/100 |
| 2005/0198014 | A1* | 9/2005 | De Lury et al. | 707/3 |
| 2005/0234959 | A1* | 10/2005 | Ronnewinkel et al. | 707/102 |

OTHER PUBLICATIONS

Poremsky, Diane. "Google and Other Search Engines: Visual Quickstart Guide" [online], May 11, 2004, Peachpit Press, ISBN 0-321-24614-4 < URL: http://proquest.safaribooksonline.com/0321246144 >, Chapter 11.*

* cited by examiner

*Primary Examiner*—Mohammad Ali
*Assistant Examiner*—Angelica Ruiz
(74) *Attorney, Agent, or Firm*—Finnegan, Henderson, Farabow, Garrett & Dunner LLP

(57) ABSTRACT

Methods and systems are disclosed for providing search results in response to a business object search request. The methods and systems may generate result business objects in response to a search request including a search term, the result business objects each having attributes at least one of which includes data that matches the search term. Also, the methods and system may generate a default attribute display set including at least a first attribute associated with each of the result business objects and a dynamic attribute display set that includes any attribute that includes data that matches the search term for any of the result business objects. Based on the default and dynamic attribute display sets, a result display set is generated. The methods and system may also display search results presenting data corresponding to the attributes included in the result display set.

10 Claims, 11 Drawing Sheets

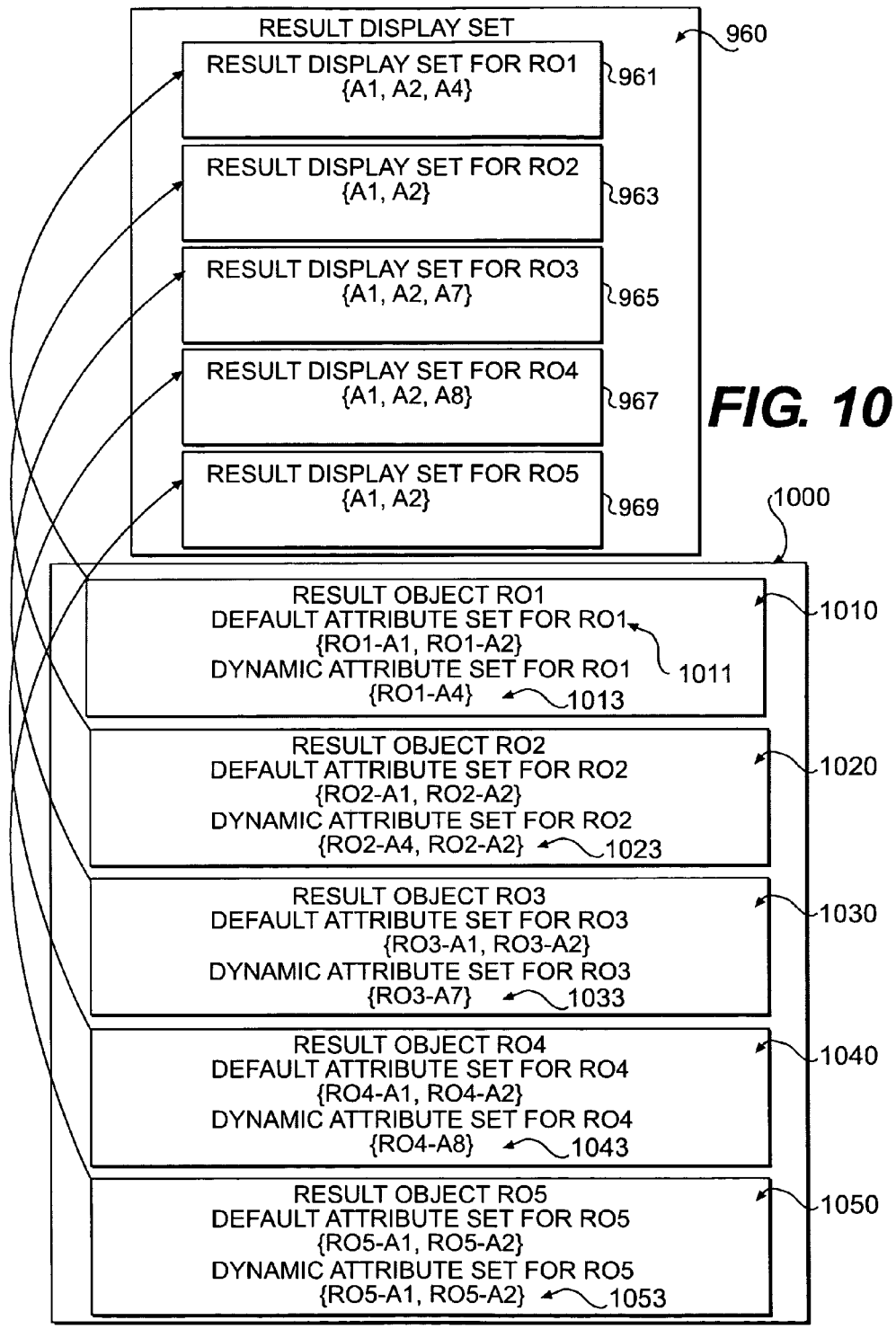

METHODS AND SYSTEMS FOR DISPLAYING MATCHING BUSINESS OBJECTS

TECHNICAL FIELD

The present invention generally relates to information retrieval based on a user query and, more particularly, to systems and methods for displaying matching business objects retrieved in a search retrieval environment.

BACKGROUND

The advent and growth of the World Wide Web and networking software have enabled private individuals and business personnel to access information from an increasing number of sources, such as web servers, database servers, enterprise systems, and other forms of information storage systems. The type of information available is also diverse. A user may access structured information (e.g., data stored in tables of a database) and unstructured information (e.g., Hypertext Markup Language (HTML) documents obtained from a Web server on the Internet).

The large number and types of documents available makes the search for specific or relevant information a complex and difficult task. To find such information, users often take advantage of search engines to help generate lists of potentially relevant documents. Conventional search engines allow a user to input a search request in a computer system and receive a result list of objects based on the search terms included in the user's request. To aid the user in assessing the relevance of the individual search hits included in the search results, the search engine may present excerpts from the documents with the search term(s) highlighted. Such operations enable the user to view the context in which the search terms appear to aid in determining the relevance of the search results.

For example, conventional search engines that provide unstructured result objects (e.g., Web page) obtained from the Internet may present results including a Uniform Resource Locator (URL) of a search result object along with a highlighted excerpt from the Internet document. This feature provides a user additional information regarding the relevance of the search result object.

Problems occur, however, when searching structured data objects, such as those provided by Enterprise Resource Planning (ERP) systems. Typically, structured data object search engines return a result list in the form of a table. The columns of the table may be predefined, thus they do not depend on the data object attributes where the search term is located. Further, they do not highlight the search term in the table, even if the appropriate column is displayed. For example, a conventional search engine is not capable of displaying a portion of data in proximity of a search term found in such a data object because the object is not a stream of words, as with the unstructured Internet document. Accordingly, conventional systems are deficient in conveying the relevance of structured data objects included in a result list. For instance, an enterprise search request including the search term "Hamburg" may result in a number of search result objects that include the term in different attributes, such as a name attribute, a city name attribute, a street name attribute, and a comments field attribute (i.e., "met him in Hamburg"). Conventional systems lack the capability of conveying the relevance of the structured result objects to the search request.

Thus, there is a need for a search engine that can convey the relevance of result objects collected in response to an enterprise search request of structured data object.

SUMMARY

The present invention is directed to methods and systems that provide search results in response to a business object search request. In one aspect, a method and system may generate result business objects in response to a search request including a search term, the result business objects each having attributes at least one of which includes data that matches the search term. Also, the methods and system may generate a default attribute display set including at least a first attribute associated with each of the result business objects and a dynamic attribute display set that includes any attribute that includes data that matches the search term for any of the result business objects. Based on the default and dynamic attribute display sets, a result display set is generated. The methods and system may also display search results presenting data corresponding to the attributes included in the result display set.

In another aspect, a method and system for providing search results for a business object search request is disclosed. The method and system may generate result business objects in response to a search request including a search term, the result business objects each having attributes, at least one of which includes data that matches the search term. The method and system may also generate a default attribute display set including at least a first attribute associated with each of the result business objects. Further, the method and system may generate, for each result business object, a result object dynamic attribute display set that includes any attribute that includes data that matches the search term for the result business object. Moreover, the method and system generates, for each result business object, a result object display set based on the default attribute display set and the result object dynamic attribute display set.

Also, aspects of the invention may include a system for providing result business objects in response to a search request including a search term, the result business objects each being associated with attributes, at least one of which includes data that matches the search term. In one aspect, the system includes a display device and a computer system for executing code that displays a user interface on the display device. The user interface may include result display data for each result business object, the display data including first display information and second display information. The first display information includes data corresponding to an attribute included in a default attribute set associated with each result business object. The second display information includes data corresponding to an attribute included in a dynamic attribute set including at least one attribute having data matching the search term for at least one of the result business objects. The result display data may be generated based on a result display set including the default and dynamic attribute sets.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, show certain aspects of the present invention and, together with the description, help explain some of the principles associated with the invention.

FIG. 10 illustrates a block diagram of another exemplary search result interface consistent with certain aspects related to the present invention.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

Overview

Methods and systems consistent with certain aspects of the present invention provide data object search results that convey the relevance of each object. In one aspect, a search engine may define a first set of attributes associated with business objects affiliated with an enterprise search request. The first set of attributes includes default attributes that are fixed for any type of business object retrieved by the search engine and identify the object. Further, the search engine may define a second set of business object attributes that includes all attributes of the result business objects that include one or more of the search terms included in the search request. The second set of attributes may change between business objects because, for example, a search term may be found in different attributes of different objects, such as an employee's last name attribute of a first object and a street name attribute of a second object. In certain aspects, the first and second sets of attributes may overlap because a result business object may include search terms in the first set of attributes, thus also affiliating the term with the second attribute set.

Based on the first and second sets of attributes, the search engine may generate a display set of attributes. The display attribute set includes those attributes that are displayed in a result list generated by the search engine. Because the first set of attributes are fixed, those attributes may always be displayed in the result list. On the other hand, because the second set of attributes may change between business objects, the type of attributes displayed via the second attribute set may vary. Accordingly, the search engine may generate and display a result list that includes the first set and second set of attributes associated with the result business objects.

In another aspect, along with a fixed first set of attributes, the search engine may generate a different second set of attributes for each result business object. Each second attribute set includes attributes that contain one or more search terms included in the search request. Thus, search engine may generate a different display set of attributes for each business object in the result list. The display sets each include the first set of attributes that are fixed across all business objects in the result list and the relevant second set of attributes corresponding to each respective result business object.

Exemplary System Environment

Figure 1:
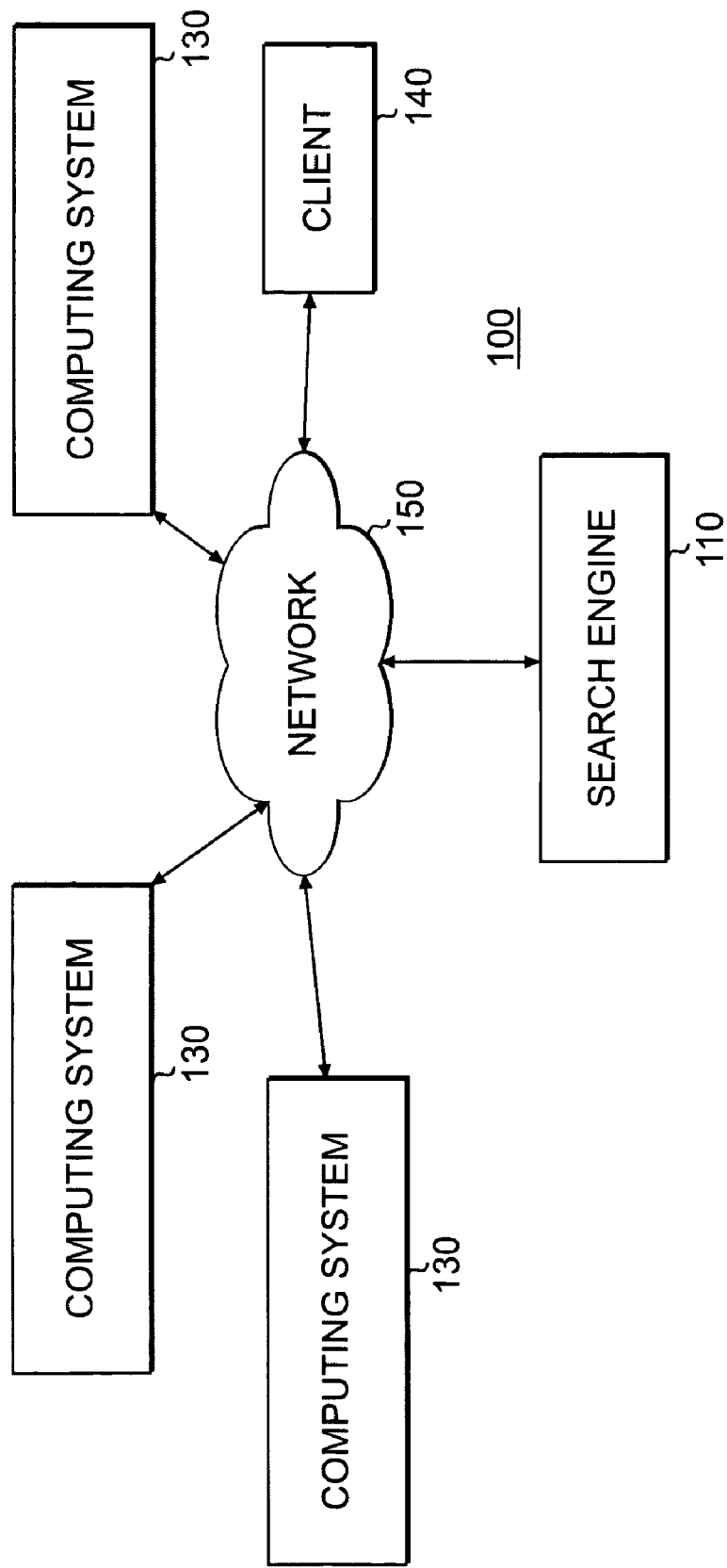
FIG. 1 illustrates a block diagram of an exemplary system environment consistent with certain aspects related to the present invention.

FIG. 1 illustrates a block diagram of an exemplary system environment 100 consistent with certain aspects related to the present invention. As shown, system environment 100 includes a search engine 110, computing systems 130, client system 140, and network 150.

Search engine 110 may be a computing system that searches for business objects having search terms included in a received search request. The term "business object," as used herein refers to any type of structured data object that may be located and included in a search result produced by search engine 110. For example, business objects may include a file or information included in a structured database maintained by an ERP system, such as a sales order form, a telephone directory, an address directory, a customer list, a product list, etc.

Search engine 110 may include components and perform processes consistent with known search engines that perform enterprise and Internet-related search functions. For example, search engine 110 may include one or more known search systems that processes search requests received by search engine 110 through an interface system that receives search requests. The search systems may parse search requests and leverage components within search engine 110, such as a ranking and sorting system, to locate business objects that match best with the search terms included in the search request. The search systems may ensure that business objects that include words that match the search terms are ranked and sorted, and provide these business objects as result objects in a search result. The interface system may configure the search result into an appropriate format and provides the result to the system that initiated the search request.

In addition to performing known search request processes, search engine 110 may also perform one or more business object matching processes consistent with certain aspects of the invention. In one aspect, search engine 110 includes systems and processes that generate first and second attributes sets associated with the business objects included in the search result. Further, search engine 110 may include systems and processes that generate a result display set based on the first and second attribute sets.

Computing systems 130 may be one or more systems that generate and maintain information searched by search engine 110 to produce search results. For example, computing systems 130 may include application and database servers that maintain and provide one or more structured databases. Computing systems 130 may or may not be associated with search engine 110. That is, one or more of computing systems 130 may be server systems that are affiliated with a business entity that implements search engine 110, such as servers used in ERP systems (e.g., application servers, portal servers, etc.) for a business organization. Alternatively, one or more of computing systems 130 may be third party server systems that have no business affiliation with search engine 110, but are accessible through ERP systems implemented with search system 110.

Client 140 may be one or more computer systems that perform known client type operations. Client 140 may execute one or more processes that provide user interfaces that allow a user to generate search requests and receive corresponding search results. Further, client 140 may display user interfaces corresponding to the search results produced by search engine 110. In one aspect of the invention, client 140 may be a computer system that is operated by a user associated with a business entity affiliated with search engine 110, such as an employee of a business entity that implements search engine 110 and/or one or more of computing systems 130. Alternatively, client 140 may be a third party computer system that is operated by private individuals that leverage search engine 110 to receive search results. In one aspect, client 140 may be operated by a user who initiates an enterprise search request that targets business objects maintained by system 100.

Network 150 may be one or more communication networks that facilitate communications between computing systems 130, client 140, and search engine 110. Based on the configuration of environment 100, network 150 may include one or more of an Extranet, an Intranet, the Internet, a Local Area Network (LAN), public switch telephone network, Integrated Services Digital Network (ISDN), radio links, Global System for Mobile Communication (GSM), and any other form of wired or wireless communication networks. Accordingly, network 150 may be compatible with any type of communication protocol used by the components of environment 100 to exchange information, such as Transmission Control/Internet Protocol (TCP/IP), Hypertext Transfer Protocol (HTTP), Wireless Application Protocol (WAP), extensible Markup Language (XML), Wireless Markup Language, etc. In one aspect, network 150 is a network implemented within an ERP system affiliated with search engine 110, computing systems 130, and/or client 140.

Although methods and systems of the present invention may be implemented in system environment 100 to provide business object result matching processes, it is not intended to be limiting. That is, aspects of the present invention may be implemented by other systems and environments that may be distributed or non-distributed. For example, search engine 110 may be located on the same computing platform as a computing system that provides result objects for the search engine. Alternatively, search engine 110 may be located on a computing platform shared by client 140 that is used by an individual to generate search requests. Further, although FIG. 1 shows components of environment 100 as separate entities, the components may be hardware and/or software that share part of the same computing system or memory system.

Defining Default Attributes

Figure 2:
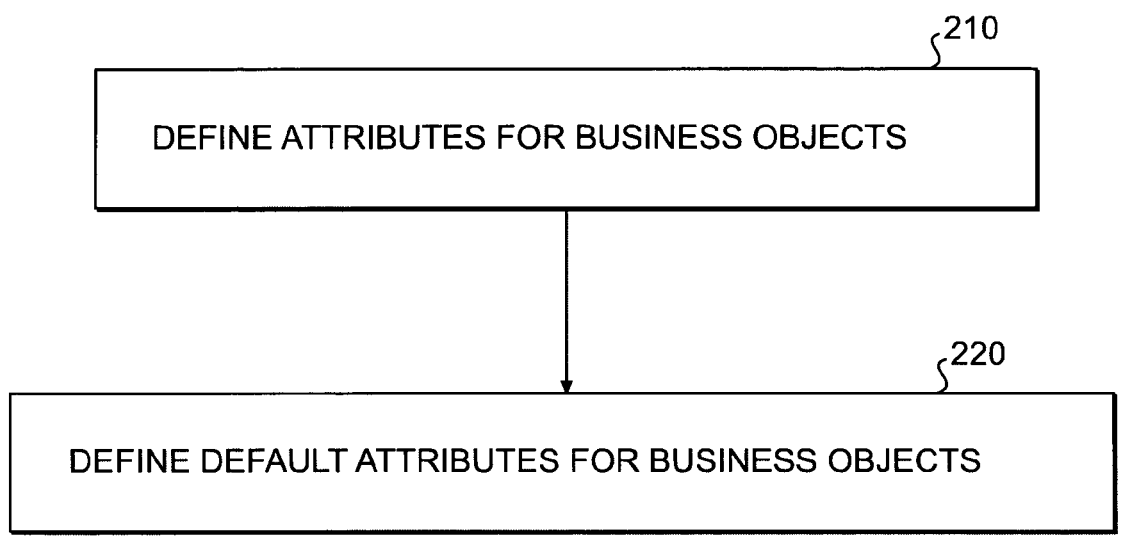
FIG. 2 illustrates a flowchart of an exemplary attribute definition process consistent with certain aspects related to the present invention.

As explained, methods and systems consistent with aspects of the present invention leverage search engine 110 to provide business object search results that display the relevance of each business object to a search request. To provide these results, one or more attributes associated with the different types of business objects should be defined. FIG. 2 illustrates a flowchart of an exemplary business object attribute defining process consistent with one aspect of the invention. Search engine 110 may be used to define one or more attributes for the business objects that may be collected by search engine 110 during a search process (Step 210). Metadata may be implemented that describes characteristics of the data associated with the attributes. For example, an object type "address" may have attributes "name," "title," and "zip code." Each individual result object has values for these attributes. For instance, there may be one address with name="Smith," title="Dr.," and zip code="12345." Metadata may be generated that describes characteristics of these attribute values. For example, the "name" attribute may be configured with metadata that ensures only certain text characters are used, that the "title" attribute is limited to predetermined values, such as "Dr.," "PhD.," or "Prof.," and the "zip code" attribute is a five digit numeric value. Thus, abstractly, a result object type is defined by a set of attributes; each individual object includes one concrete value for each attribute; and several characteristics of these values are described by the attribute's metadata.

Once the attributes are defined, search engine 110 may define a default set of attributes for the business objects that are used for displaying the matching business objects consistent with aspects of the present invention (Step 220). In one aspect, the default attribute set includes one or more attributes that search engine 110 will include in a result display set that is used to display result business objects to a user. The default attributes are fixed such that search engine 110 always displays the data affiliated with the attributes for each business object in a search result regardless of the type of business object. Search engine 110 may store identifiers of the defined attributes in a memory device for future use when processing search requests.

Business Object Search Request Process

Figure 3:
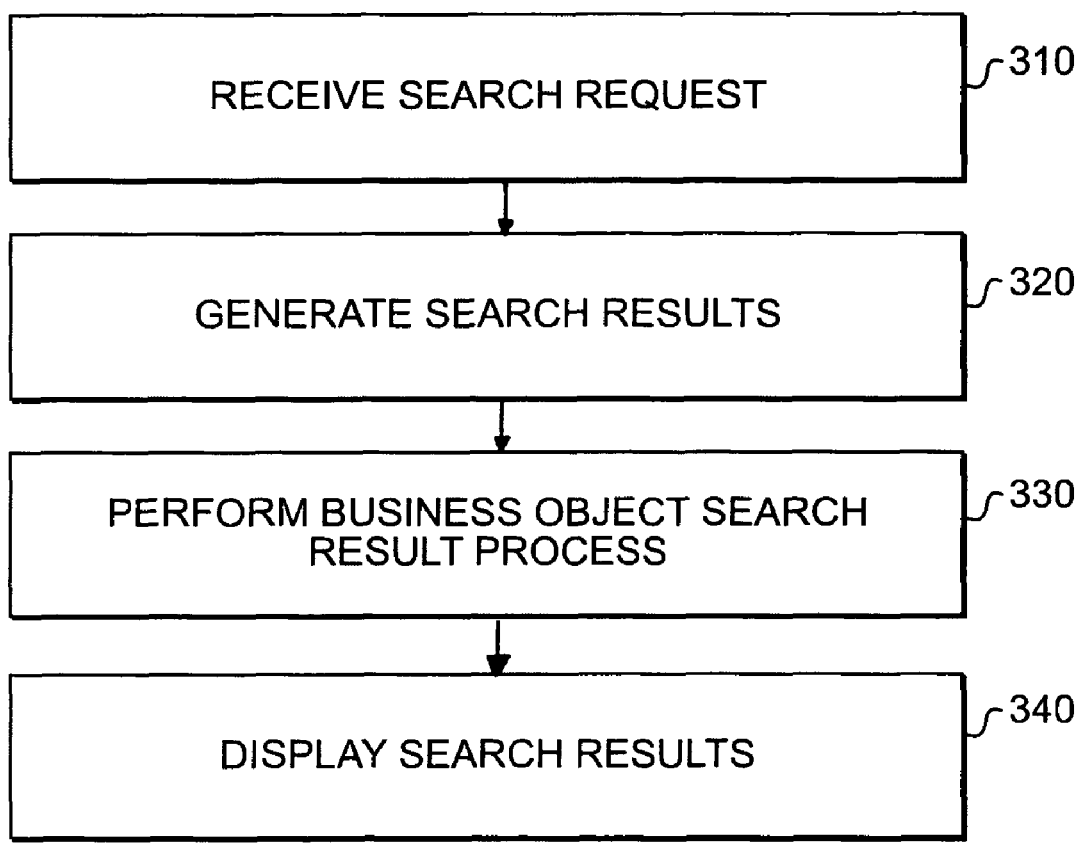
FIG. 3 illustrates a flowchart of an exemplary business object search process consistent with certain aspects related to the present invention.

As explained, search engine 110 is configured to process search requests received from client 140 to provide business object search results that convey the relevance of each object to the search request. FIG. 3 shows a flowchart of an exemplary business object search request process that may be performed by search engine 110. Initially, search engine 110 may receive a search request for business objects from client 140 (Step 310). The search request may include one or more search terms and may be an enterprise search request generated by a user operating client 140.

Once the search request is received, search engine 110 may perform known structured data object search processes to search, identify, and collect business objects that include attributes having data matching the one or more search terms. Based on the search processes, search engine 110 generates search results to the search request (Step 320). The search results may include result business objects that meet the criteria of the search request (i.e., include terms that match one or more of the search terms).

Based on the search results, search engine 110 performs a business object search result process that generates display search results in a manner consistent with certain aspects related to the present invention (Step 330). Using the display search results, search engine generates and provides the display search results to client 140, where a result list is displayed by appropriate components within client 140 in a manner consistent with certain aspects of the present invention (Step 340).

Business Object Result Processes

Figure 4:
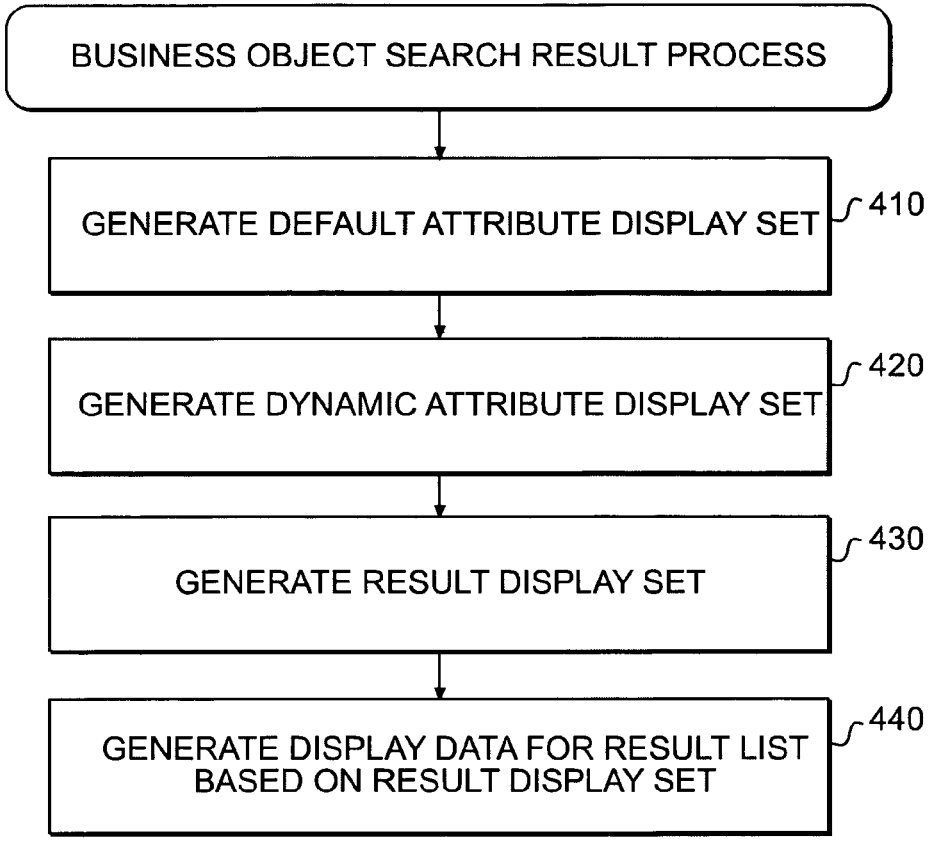
FIG. 4 illustrates a flowchart of an exemplary business object search result process consistent with certain aspects related to the present invention.

FIG. 4 shows a flowchart of an exemplary business object search result process performed by search engine 110 when processing a search request. In one aspect, search engine 110 may generate a default attribute display set based on the default attributes defined in the process described above in connection with FIG. 2 (Step 410). The default attribute display set identifies those default attributes that are to be displayed for every result business object obtained from search engine 110. Search engine 110 collects the data for the default attributes corresponding to each result business object and stores them along with their metadata as a data structure in a memory device included in search engine 110.

Further, search engine 110 may generate a dynamic attribute display set based on the result business objects included in the search results produced by search engine 110 (Step 420). Search engine 110 may store data corresponding to each attribute included in the dynamic attribute display set in a data structure located in a memory device included in search engine 110. In one aspect, search engine 110 generates the dynamic attribute display set by analyzing the result business objects to determine those attributes that include data matching one or more search terms of the search request. For example, in an exemplary search request that includes a first search term "ST1," search engine 110 may determine those attributes having data that matches the term ST1 for each of the result business objects. Thus, if a first result business object includes a value ST1 for a first attribute A1 having corresponding metadata, that attribute and metadata is added to the dynamic attribute display set. Also, if a second result business object includes a value ST1 for a second attribute A2, both attributes A1 and A2 and corresponding metadata are added to the dynamic attribute display set. As a result of the analysis, search engine 110 generates a result attribute display set that includes all attributes and their corresponding data matching the one or more search terms.

Based on the default and dynamic attribute display sets, search engine 110 generates a result display set that includes all attribute data to be displayed in a result list presented to a user of client 140 (Step 430). The result display set may be stored in a data structure implemented by search engine 110. In one aspect, search engine 110 generates the result display set by combining the default and dynamic attribute display sets. In circumstances where the two attribute display sets include attributes that overlap, search engine 110 may include only one instance of the overlapping attributes. For example, for a search result including five business objects, each associated with the same ten predefined attributes A1 to A10, search engine 110 may generate a result display set including a first set of attributes corresponding to the default attribute set and a second set of attributes corresponding to those attributes added to the dynamic attribute display set. Thus, if the default attribute display set includes two attributes A1 and A2, and the dynamic attribute display set includes four attributes A2, A4, A7, and A8, the result display set will include attributes A1, A2, A4, A7, and A8 and the data for these attributes.

Figure 5:
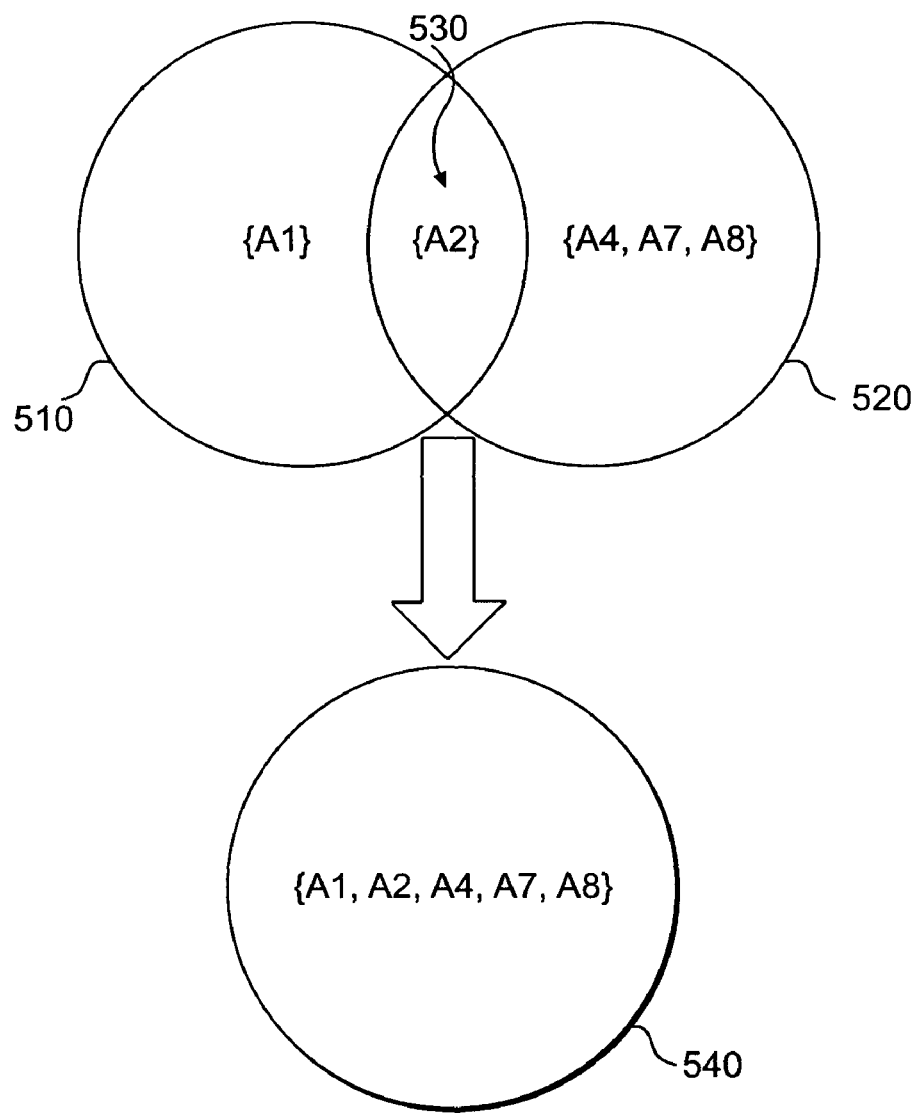
FIG. 5 illustrates a block diagram of exemplary attribute display sets consistent with certain aspects related to the present invention.

To better illustrate the above aspects of the invention, FIG. 5 shows a block diagram of display sets associated with the five exemplary result business objects having ten attributes A1 to A10. In accordance with this example, search engine 110 has defined two attributes A1 and A2 as default attributes for the business objects Accordingly, default attribute display set 510 is shown including attributes A1 and A2. Also, in accordance with the above example, dynamic attribute display set 520 includes attributes A2, A4, A7, and A8. Because attribute A2 is in both default attribute display set 510 and dynamic attribute display set 520, the two sets overlap for that given attribute, shown as overlap area 530. As a result of the analysis described above, search engine 110 may generate a result display set 540 that includes the attributes in the dynamic and default attribute sets (i.e., A1, A2, A4, A7, and A8).

Returning back to FIG. 4, search engine 110 generates display data for a result list including the result business objects the (Step 440). This process may include configuring display data for each result business object based on the result display set generated in Step 430. For example, search engine 110 may configure a search result interface that includes containers for each result business object that may be arranged in accordance with known search engine processes. Each container may include attribute data corresponding to the attributes in the result display attribute for the given result business object. Accordingly, when the display data is generated into the search results and subsequently displayed by client 140, the user may view a result list of business objects that provide display data reflecting the attribute data corresponding to the attributes in the result display set. The displayed data may include data reflecting an attribute's data values and corresponding metadata. To enhance the relevant display of the search results, the search terms may be enhanced in the attribute data they are found when displayed to the user of client 140. Enhancement may include highlighting, underlining, using color variations for the text of attribute values, and other form of manipulation that enhance the displayed text.

Figure 6:
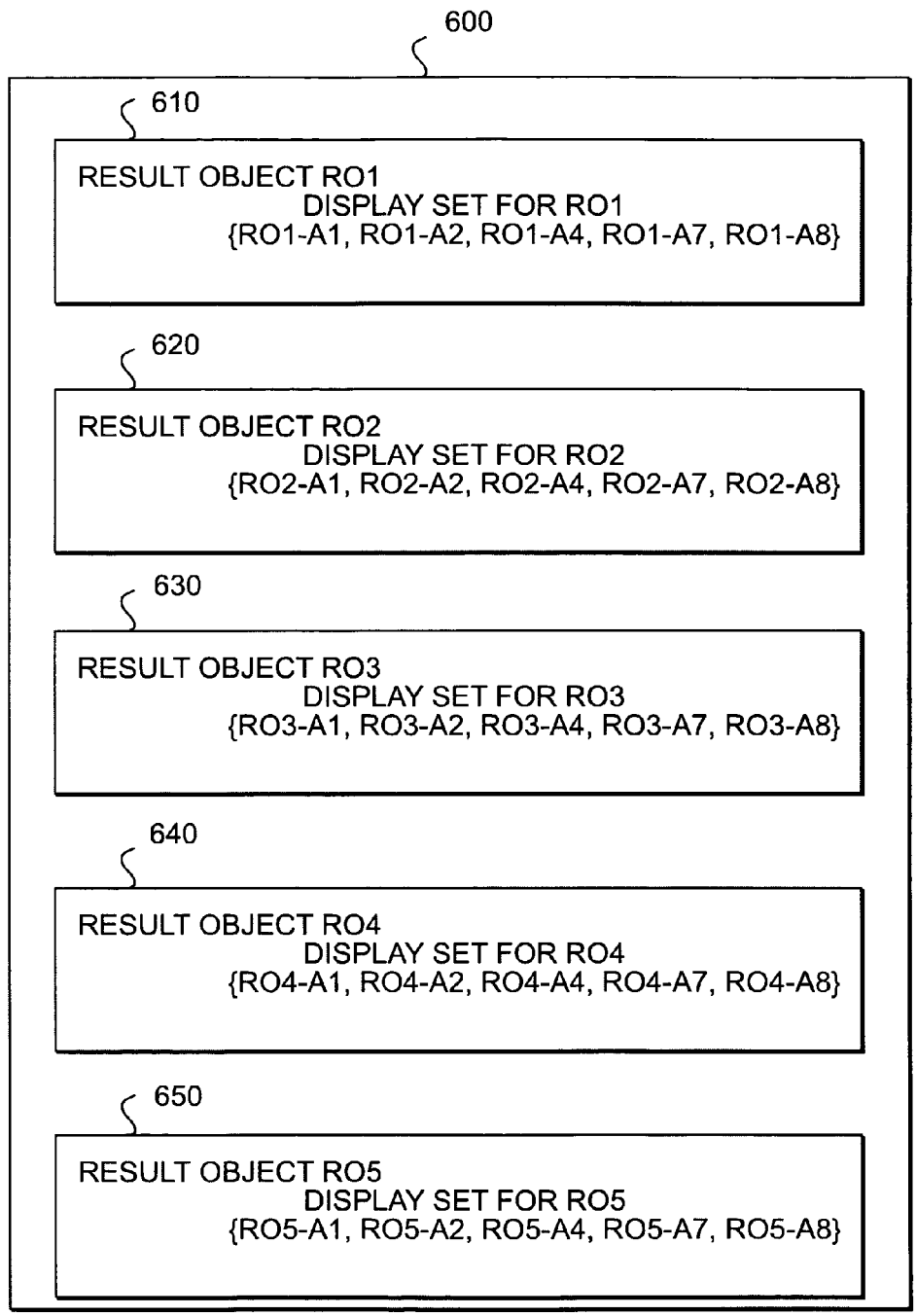
FIG. 6 illustrates a block diagram of an exemplary search result interface consistent with certain aspects related to the present invention.

To better illustrate the above described aspects of the invention, FIG. 6 shows a block diagram of an exemplary search result interface 600 associated with five exemplary result business objects RO1 to RO5. As shown, interface 600 includes five containers 610-650 corresponding to the result business objects RO1 to RO5. Each container includes data reflecting the attribute data for the result display set attributes for a given result business object. Thus, container 610 for result business object RO1 includes attribute data for attributes A1, A2, A4, A7, and A8 for business object RO1, while container 650 includes attribute data for the same attributes corresponding to business object RO5. Thus, the search results generated by search engine 110 and displayed by client 140 may include business objects with displayed attributes that may or may not include the search term of the search request.

Figure 7:
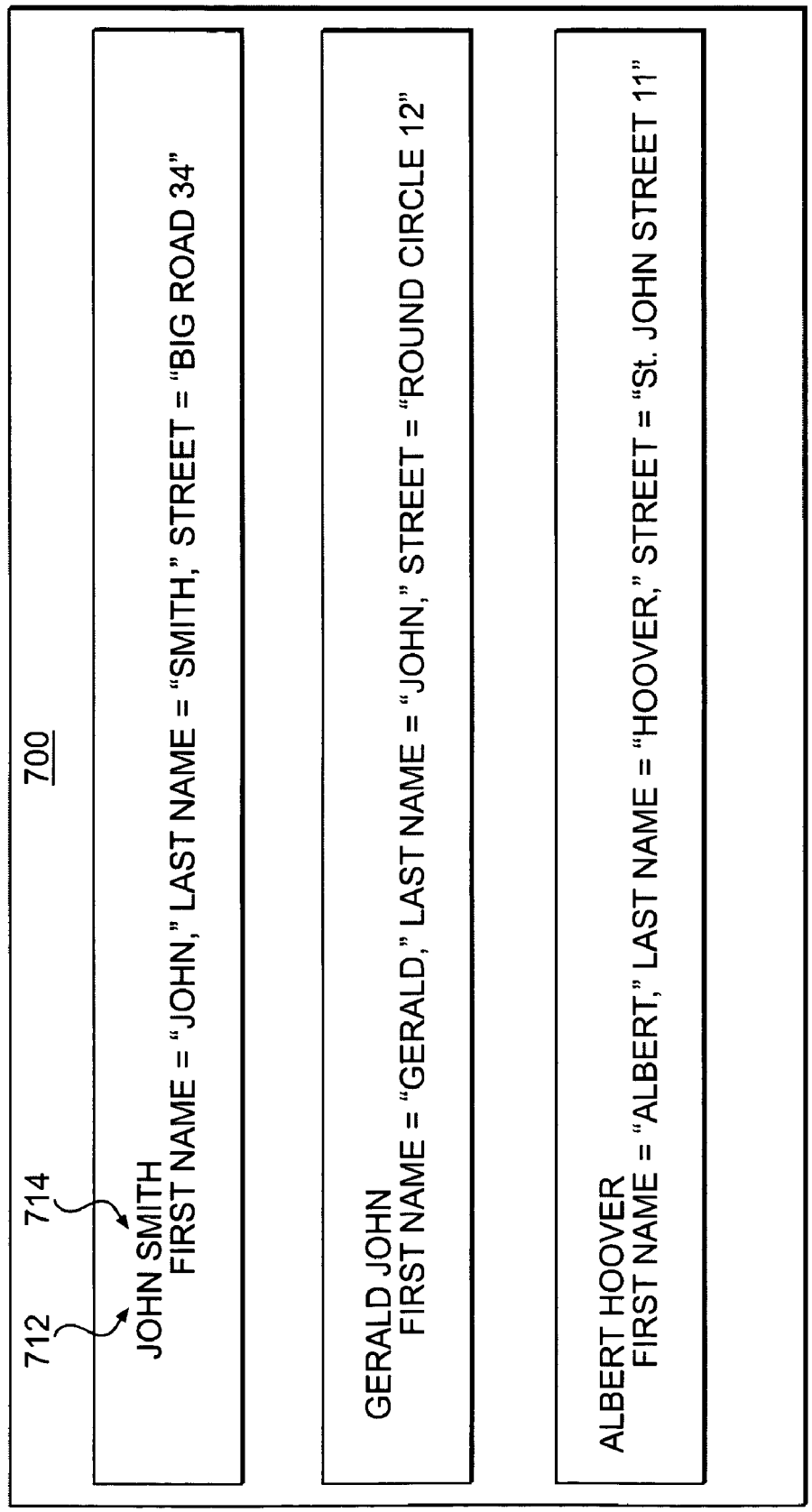
FIG. 7 illustrates a block diagram of another exemplary search result interface consistent with certain aspects related to the present invention.

To provide further explanation, FIG. 7 shows a search result interface 700 corresponding to interface 600 for a search request having a search term "John." In this example, there are two predefined default attributes; first and last name attributes 712 and 714. Also, as can be seen, search engine generated a dynamic attribute display set including three attributes; first name, last name, and street name attributes. Thus, in the exemplary interface 700, the result display set includes the first name, last name, and street address attributes because the first and last name attributes overlap with the dynamic attributes. As shown, the enhanced search term "John" is presented in different attributes. Accordingly, the user of client 140 is presented with relevancy information regarding the result business objects and the search request. For instance, at first glance, the user may be confused as to why the name "Albert Hoover" was included in the search results. However, viewing the displayed dynamic attributes results in a understanding for this result business object's inclusion in the search results. That is, the term "John" is present in the street name attribute for that business object, and thus its inclusion in the dynamic attribute display set and displayed to the user.

Accordingly, methods and systems consistent with certain aspects of the present invention are capable of providing search results for business objects in such a manner that identifies a relevancy between each business object and the search terms included in a search request.

Alternative Business Object Result Processes

Figure 8:
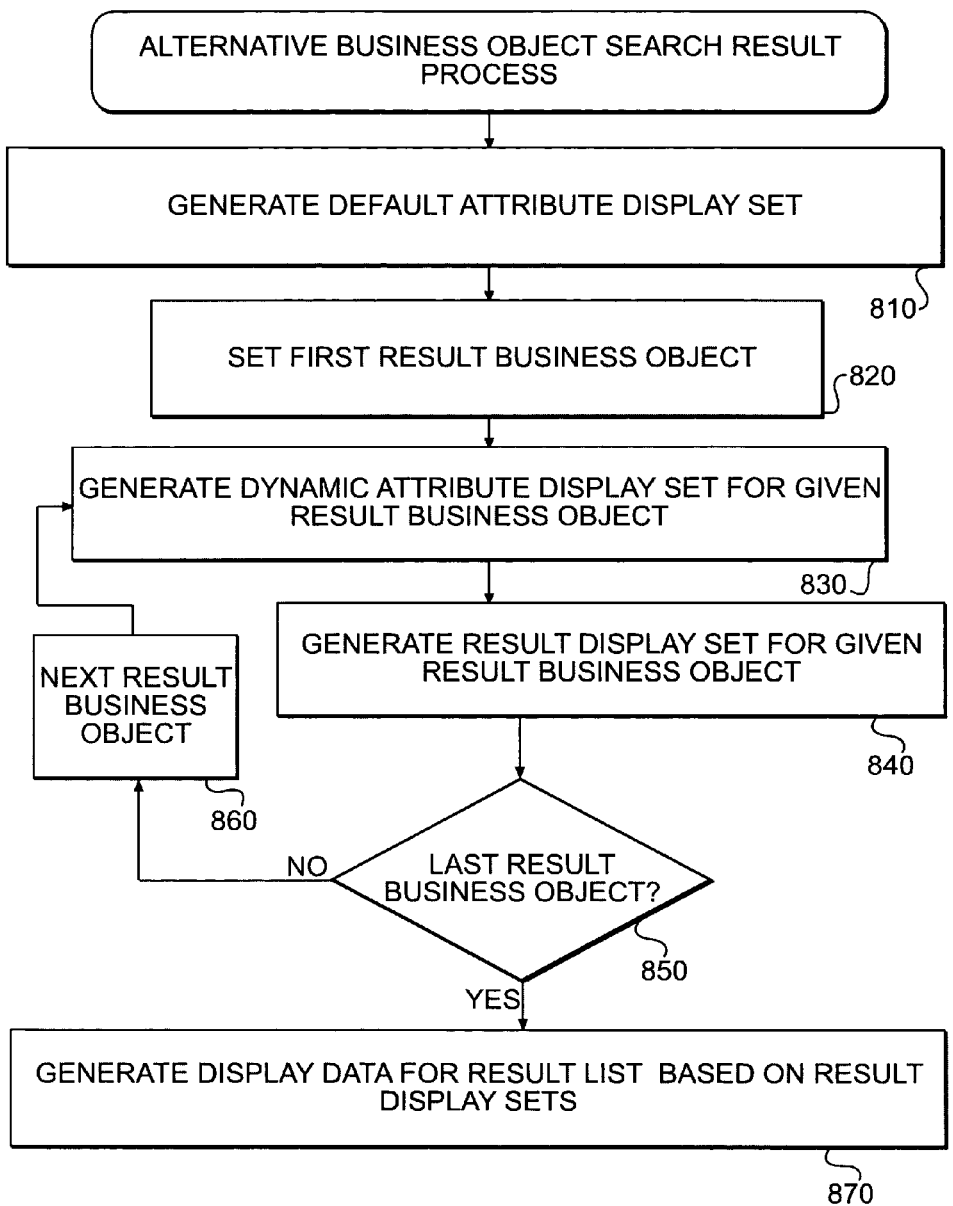
FIG. 8 illustrates a flowchart of another exemplary business object search result process consistent with certain aspects related to the present invention.

Although the processes described in connection with FIG. 4 provide relevant business object search results, they are not intended to be limiting. Alternative processes may be implemented by search engine 110 to provide relevant display data for search results of an enterprise search request. FIG. 8 shows a flowchart of an alternative business object search result process consistent with certain aspects of the present invention. In one aspect, search engine 110 may generate a default attribute display set in a manner consistent with those processes described above in connection with Step 410 of FIG. 4. (Step 810). The default attribute display set identifies those default attribute data that are to be displayed for every result business object obtained from search engine 110.

Further, search engine 110 may generate a dynamic attribute display set based on the result business objects included in the search results produced by search engine 110. In this aspect of the invention, search engine 110 analyzes each result business object to determine those attributes that include one or more search terms of the search request. Accordingly, search engine 110 sets a first result business object for analysis (Step 820). The first result business object may be any of the business objects obtained by search engine 110 as a result of the search processes performed in response to a received search request.

Subsequently, search engine 110 generates the dynamic attribute display set for the given result business object (Step 830). Search engine 110 may perform this process step in a manner similar to that described above in connection with step 420 of FIG. 4, except that an individual dynamic attribute display set is generated for the given result business object. For example, consider two result business objects RO1 and RO2, each having two attributes A1 and A2. If the first result business object RO1 includes a search term that matches a data value for first attribute RO1-A1 and not the data values for its second attribute RO1-A2, only the first attribute RO1-A1 and its corresponding metadata are added to the dynamic attribute display set for the first result business object. Along the same lines, if the second result business object RO2 includes the search term that matches a data value for its second attribute RO2-A2, but not its first attribute RO2-A1, only the second attribute RO2-A2 and its metadata are added to the dynamic attribute display set for the second result object RO2. As a result of the analysis, search engine 110 generates a dynamic attribute display set for each result business object, and stores the sets in a memory device.

While processing a given result business object, search engine 110 generates a business object result display set for the given object based on the default and dynamic attribute display sets for that object. (Step 840). The result display set for the given business object includes all attributes to be displayed for that object when presented in a result list for a user of client 140. Search engine 110 generates the business object result display set by combining the default and dynamic attribute display sets for the given business object under analysis. In circumstances where the two attribute display sets include attributes that overlap, search engine 110 may only include one instance of the overlapped attributes.

Figure 9A:
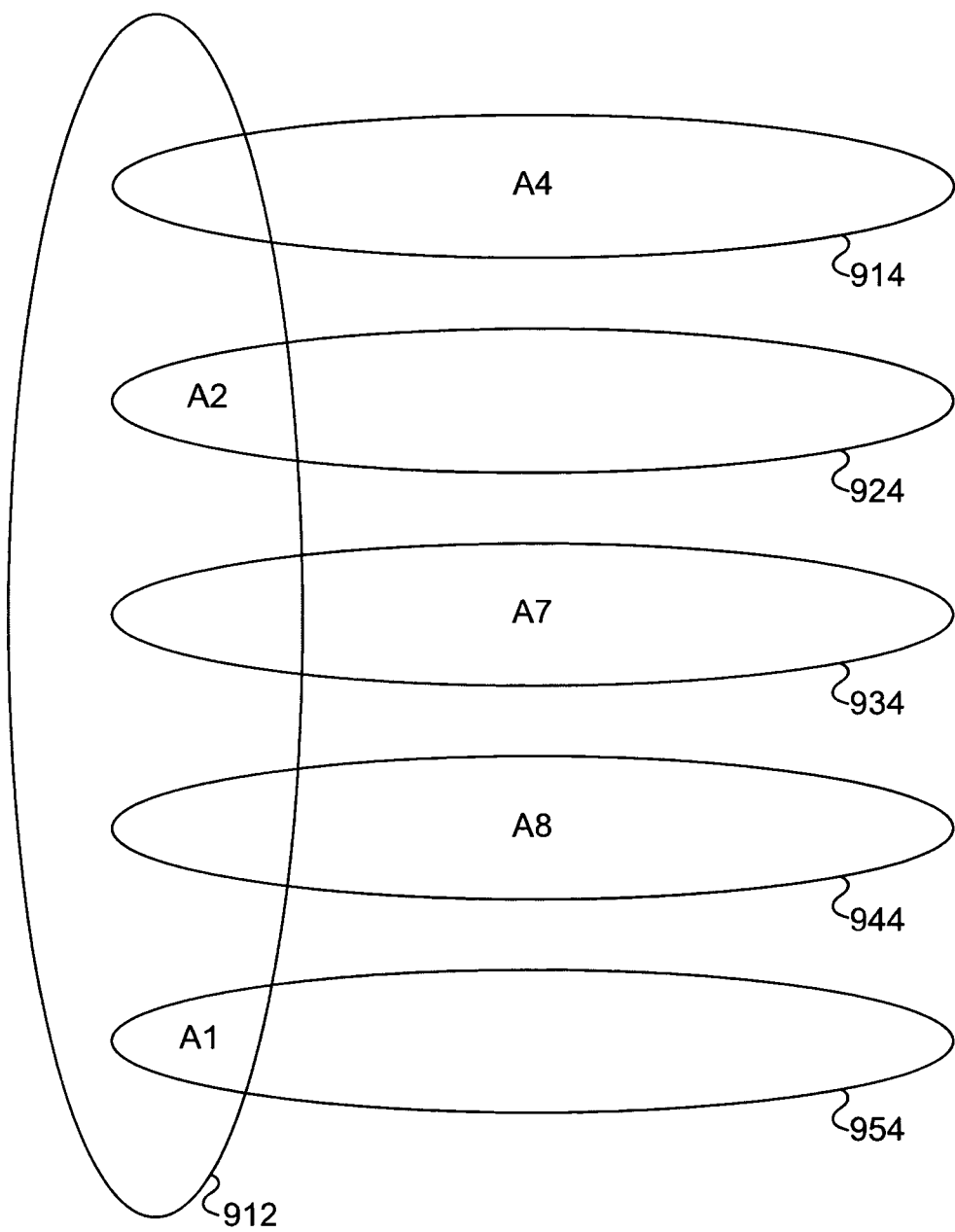
FIGS. 9A and 9B illustrates a block diagrams of exemplary attribute display sets consistent with certain aspects related to the present invention.

To better illustrate the above aspects of the invention, FIG. 9A shows a block diagram of default and dynamic display sets associated with five exemplary result business objects RO1 to RO5 having ten attributes A1 to A10. In accordance with this example, search engine 110 has defined two attributes A1 and A2 as default attributes for the business objects. Thus, FIG. 9A shows default display set 912 including these attributes. Also, in accordance with the above example, the dynamic attribute display sets 914, 924, 934, 944, and 954 for each result business object RO1 to RO5 includes only those attributes having a search term for the corresponding business object. Thus, as shown, each dynamic attribute display set 914, 924, 934, 944, and 954 includes different attributes; A4, A2, A7, A8, and A1, respectively. It should be noted, however, that the attributes listed in each dynamic attribute display set 914-954 are based on an exemplary search term match with a given result object. Aspects of the invention allow for the dynamic attribute display sets 914, 924, 934, 944, and 954 to include some or all of the same attributes based on the search term and data values associated with the result business object's attributes. In certain instances, the default attributes A1 and A2 (which are common across result business objects RO1 to RO5) may overlap to the dynamic attribute display sets 914, 924, 934, 944, and 954. For example, attribute A2 for result business object RO2 is shown in both default and dynamic attribute display sets 912 and 924, respectively.

Figure 9B:
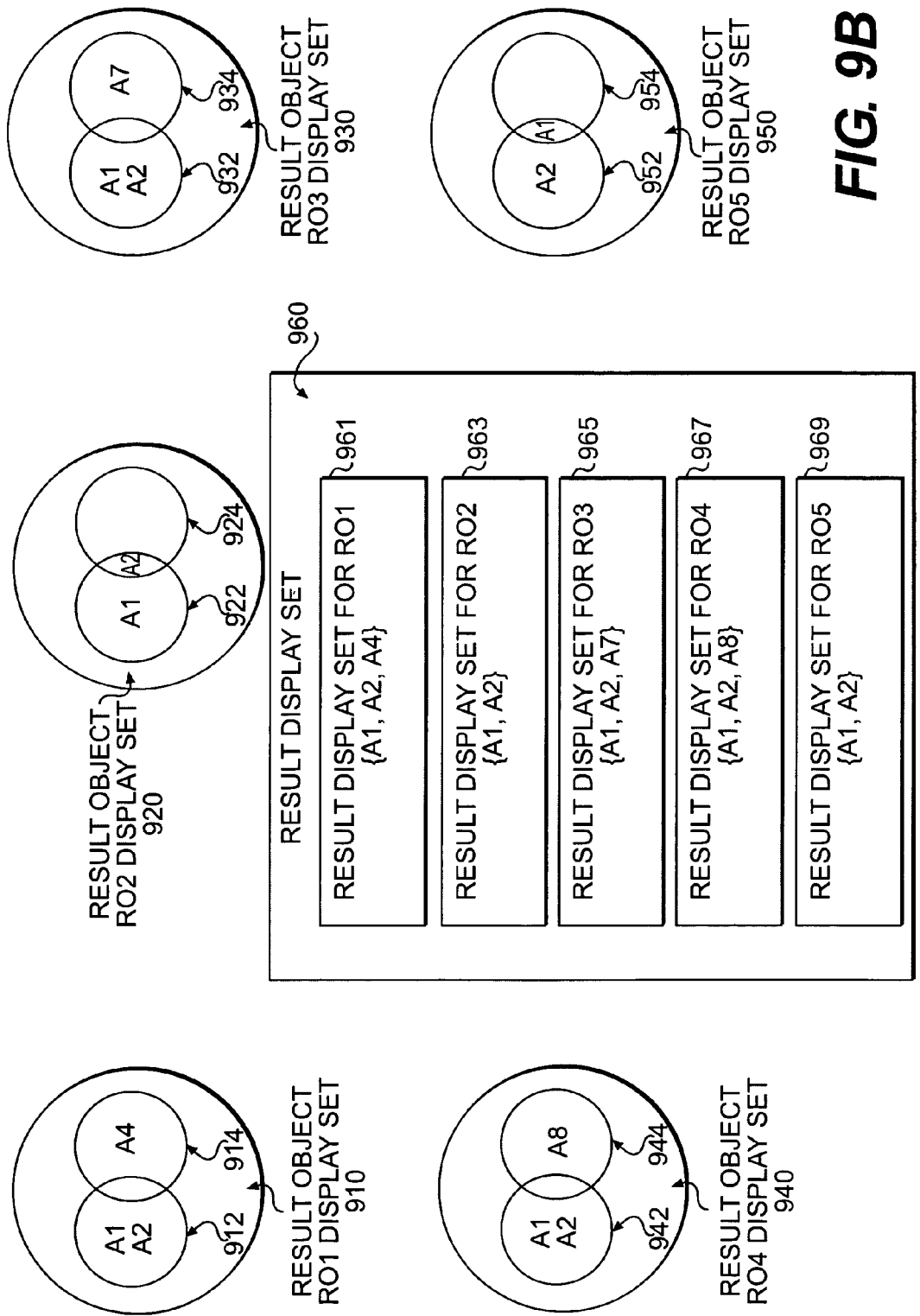

Based on default and dynamic display sets 912 and 914, 924, 934, 944, and 954, result object display sets are generated. FIG. 9B shows a block diagram of result object display sets 910, 920, 930, 940, and 950 associated with result business objects RO1 to RO5. Each result object display set 910, 920, 930, 940, and 950 includes all attributes included in the result business object's respective default and dynamic attribute display sets. For example, result object display set 910 includes default attribute display set 912 attributes and dynamic display set 914 attributes for result object RO1. Search engine 110 may generate a result display set 960 from the business object result object display sets 910, 920, 930, 940, and 950. As shown, set 960 includes result object display sets 961, 963, 965, 967, and 969 that correspond to result object display sets 910, 920, 930, 940, and 950, respectively. As illustrated, each result object display set 961, 963, 965, 967, and 969 include all the attributes included in each respective 910-950.

To better illustrate the above aspects of the invention, FIG. 9 shows a block diagram of result object display sets 910, 920, 930, 940, and 950 associated with five exemplary result business objects RO1 to RO5 having ten attributes A1 to A10. In accordance with this example, search engine 110 has defined two attributes A1 and A2 as default attributes for the business objects. Accordingly, the default attribute display sets 912, 922, 932, 942, and 952 for each business object are shown including attributes A1 and A2. Also, in accordance with the above example, the dynamic attribute display sets 914, 924, 034, 944, and 954 for each result business object includes only those attributes having a search term for the corresponding business object. Thus, as shown, each dynamic attribute display set 914, 924, 034, 944, and 954 includes different attributes. It should be noted, however, that the attributes listed in each dynamic attribute display set 914, 924, 034, 944, and 954 are based on an exemplary search term match with a given result object. Aspects of the invention allow for the dynamic attribute display sets 914, 924, 034, 944, and 954 to include some or all of the same attributes based on the search term and data associated with the result business object's attributes.

In certain instances, the default attributes A1 and A2 (which are common across result business objects RO1 to RO5) may overlap to the dynamic attribute display sets 914, 924, 934, 944, and 954. For example, attribute A2 for result business object RO2 is shown in both default and dynamic attribute display sets 922 and 924. Each result object display set 910, 920, 930, 940, and 950 includes all attributes included in the result business object's respective default and dynamic attribute display sets. Search engine 110 may generate a result display set 960 from the business object result object display sets 910, 920, 930, 940, and 950. As shown, set 960 includes result object display sets 961, 963, 965, 967, and 969 that correspond to result object display sets 910, 920, 930, 940, and 950, respectively.

Returning back to FIG. 8, once search engine 110 generates the result display set for the given result business object, it determines whether there are any addition result business objects to process (Step 850). If the given result business object is the last business object to process (Step 850; Yes), the alternative business object search result process proceeds to Step 870. On the other hand, if there are additional business objects that have not been processed (Step 850; NO), search engine 110 identifies the next result business object (Step 860), and the process returns to Step 830 to generate dynamic attribute and result display sets for the next business object.

At Step 870, search engine 110 may generate and configure display data for a result list including the result business objects based on the result objects display sets (Step 440). This process may include configuring display data for each result business object based on the result object display sets generated in Step 840 for each object. For example, search engine 110 may configure a search result interface that includes containers for each result business object that may be sorted or ranked in accordance with known search engine processes. Each container may include attribute data corresponding to the attributes in the result display attribute for the given result business object. Accordingly, when the search results are displayed by client 140, the user may view a result list of business objects that provide data reflecting the attribute data corresponding to the attributes in the result display set. To enhance the relevant display of the search results, the search terms may be enhanced (e.g., highlighted) in the attributes they are found when displayed to the user of client 140.

To better illustrate the above-described aspects of the invention, FIG. 10 shows a block diagram of an exemplary search result interface 1000 associated with five exemplary result business objects RO1 to RO5. As shown, interface 1000 includes five containers 1010 to 1050 corresponding to the result business objects RO1 to RO5, respectively. Each container includes data reflecting the attribute data for the result display set attributes for a given result business object. As shown in FIG. 10, the result object display sets for each container 1010-1050 are associated with the displays sets 961-969, respectively, of result display set 960. Because each business object is associated (depicted by arrows) with the same attributes included in the default attribute display set, each container 1010-1050 includes data corresponding to default attributes A1 and A2 for the given business object (e.g., default attribute set 1011).

Also, in accordance with these aspects of the present invention, each container 1010 to 1050 includes attribute data for a given business object's dynamic attribute set. Thus, containers 1010-1050 include dynamic attribute set data 1013 to 1053, respectively. For example, container 1010 includes data for dynamic attribute set 914, which as shown, includes attribute RO1-A4. Container 1040, on the other hand, includes data for dynamic attribute RO4-A8, which is included in dynamic attribute set 944.

Accordingly, in these aspects of the present invention, search engine 110 generates display data that provides information conveying the relevancy of each result business object to the search terms included in the search request. As such, each result business object may be presented with default attribute data that is common across all result business object types, and dynamic attribute data that corresponds to a given business object's relevancy to the search request. Thus, a user may view a result list that always includes default attribute data for all result business objects, and any other attribute data for a given business object that includes any matching search terms. The other attribute data may be visually set apart from the other text using output techniques, such as bolding, underlining, highlighting, coloring, etc.

The above described user interfaces are exemplary and are not intended to be limiting. Methods and systems consistent with aspects related to the present invention may generate and display different types of user interfaces that reflect the result business object matching processes performed by search engine 110.

For purposes of explanation only, certain aspects of the present invention are described herein with reference to the components illustrated in FIG. 1. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 2, 3, 4, and 8 are exemplary and not intended to be limiting. Thus, other method steps may be used, and even with the methods depicted in FIGS. 2, 3, 4, and 8, the particular order of events may vary without departing from the scope of the present invention. Moreover, certain steps may not be present and additional steps may be implemented in FIGS. 2, 3, 4, and 8. Also, the processes described herein are not inherently related to any particular apparatus and may be implemented by any suitable combination of components.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method executed by at least one computer, the method comprising:

generating result business objects in response to a search request including a search term, the result business objects each having attributes, at least one of which matches the search term, the result business objects including at least a first result business object and a second result business object;

accessing a default attribute display set identifying at least one previously defined attribute for display, the previously defined attribute being displayed when the previously defined attribute does not match the search term and being associated with each of the result business objects;

generating a dynamic attribute display set including dynamic attributes distinct from the previously defined attribute of the default attribute display set, the dynamic attribute display set being selected from the attributes for the result business objects that match the search term for at least one of the result business objects;

generating a result display set based on the default and dynamic attribute display sets;

storing the result display set in a memory device; and displaying search results presenting the attributes included in the result display set, including displaying, for the result business objects, the previously defined attribute of the default attribute display set and the dynamic attributes of the dynamic attribute display set, wherein a selected one of the dynamic attributes is displayed for both the first result business object and the second result object when the selected dynamic attribute of the first result business object does not match the search term, provided the selected dynamic attribute of the second result business object matches the search term, wherein the selected dynamic attribute is displayed separately for each result business object.

2. The method of claim 1, further including:

adding a new attribute to the dynamic attribute display set when at least one of the result business objects includes data for the new attribute that matches the search term.

3. The method of claim 1, further including:

enhancing the search term for each attribute included in the result display set having data that matches the search term.

4. The method of claim 3, wherein the displayed data for at least one of the attributes that does not match the search term for a given result business object does not include an enhanced search term.

5. The method of claim 1, wherein generating a dynamic attribute display set includes:

for each result business object:

identifying any attribute that includes data that matches the search term; and adding the identified attribute to the dynamic attribute display set.

6. A computer system comprising a memory device, the computer system being configured to:

generate result business objects in response to a search request including a search term, the result business objects each having attributes, at least one of which matches the search term, the result business objects including at least a first result business object and a second result business object;

access a default attribute display set identifying at least one previously defined attribute for display, the previously defined attribute being displayed when the previously defined attribute does not match the search term and including at least a first attribute associated with each of the result business objects;

generating a dynamic attribute display set including dynamic attributes distinct from the previously defined attribute of the default attribute display set, the dynamic attribute display set being selected from the attributes for the result business objects that match the search term for at least one of the result business objects;

generate a result display set based on the default and dynamic attribute display sets;

store the result display set in the memory device; and display search results presenting the attributes included in the result display set including displaying, for the result business objects, the previously defined attribute of the default attribute display set and the dynamic attributes of the dynamic attribute display set, wherein a selected one of the dynamic attributes is displayed for both the first result business object and the second result object when the selected dynamic attribute of the first result business object does not match the search term, provided the selected dynamic attribute of the second result business object matches the search term, wherein the selected dynamic attribute is displayed separately for each result business object.

7. The system of claim 6, wherein the computer system adds a new attribute to the dynamic attribute display set when at least one of the result business objects includes data for the new attribute that matches the search term.

8. The system of claim 6, wherein the search results includes an enhanced search term for each attribute included in the result display set having data that matches the search term.

9. The system of claim 8, wherein the displayed data for at least one of the attributes that does not match the search term for a given result business object does not include an enhanced search term.

10. The system of claim 6, wherein the computer system generates the dynamic attribute display set by:

for each result business object:

identifying any attribute that includes data that matches the search term; and adding the identified attribute to the dynamic attribute display set.

* * * * *